United States Patent [19]

Aoyama et al.

[11] 4,019,321

[45] Apr. 26, 1977

[54] CONTROLS FOR A HYDRAULICALLY DRIVEN VEHICLE

[75] Inventors: Ryozo Aoyama; Yukinobu Matsuda; Mitsuo Urushima, all of Hirakata, Japan

[73] Assignee: Kabushiki Kaisha Komatsu Seisakusho, Tokyo, Japan

[22] Filed: Oct. 8, 1975

[21] Appl. No.: 620,817

[30] Foreign Application Priority Data

Oct. 8, 1974 Japan .............................. 49-120932
Feb. 26, 1975 Japan .............................. 50-22738

[52] U.S. Cl. ................................ 60/484; 180/6.48
[51] Int. Cl.² ........................................ F15B 11/16
[58] Field of Search ..................... 60/395, 484, 905; 91/411 R; 180/6.48

[56] References Cited

UNITED STATES PATENTS

| | | | |
|---|---|---|---|
| 3,035,414 | 5/1962 | Smith | 60/905 X |
| 3,672,161 | 6/1972 | Krusche et al. | 180/6.48 X |
| 3,774,707 | 11/1973 | Bridwell et al. | 180/6.48 |
| 3,917,014 | 11/1975 | Ward | 60/484 X |

*Primary Examiner*—Edgar W. Geoghegan
*Attorney, Agent, or Firm*—Armstrong, Nikaido & Marmelstein

[57] ABSTRACT

Controls for a hydraulically driven vehicle, so designed as to actuate the vehicle to a leftward or rightward revolution including a lever for travel and a pair of pedals for directional control which are operable at the same time and being controls for a hydraulically driven vehicle, where a parking brake is actuated, for damping and non-damping, by hydraulic pressure, and a spring is mounted in place between a motor for travel and a top belt, and a hydraulic pressure source for driving the motor for travel and a hydraulic pressure source for the parking brake are so designed as to be one and the same, thereby achieving the object of simplifying a hydraulic pressure circuit.

5 Claims, 3 Drawing Figures

CONTROLS FOR A HYDRAULICALLY DRIVEN VEHICLE

BACKGROUND OF THE INVENTION

The present invention relates to controls for a hydraulically driven vehicle such as a hydraulic pressure type power shovel or the like, wherein the direction of travel is subjected to control by a pair of hydraulic motors arranged in place on the right and left sides, thereof respectively.

In conventional practice, controls of this category have usually comprised a pair of independent control levers arranged in place on the right and left sides and connected with a pair of control sections of a hydraulic motor for driving the right and left drive wheels, respectively.

However, in the case of conventional technology of this category, operational control is complicated due mainly to the dual system of control levers; and therefore, special skill has been required for proper operation of such a vehicle.

One object of the present invention rests in providing controls for a hydraulically driven vehicle which are completely capable of eliminating said operational defects inherent in conventional technology.

Another object of the present invention rests in providing controls for a hydraulically driven vehicle which are completely capable of causing the vehicle to engage in forward movement, rearward movement, right revolution, and left revolution as well. All of this is achieved by the proper actuation of a lever for forward and rearward travel and a pair of pedals for additional directional control arranged in place on the right and on the left sides, respectively.

Another object of the present invention rests in providing controls for a hydraulically driven vehicle, wherein a lever for forward and rearward travel and a pair of pedals for additional directional control arranged in place on the right and left sides, respectively are kept free from being mechanically engaged with each other in mechanical terms and comprise independent operating mechanisms, respectively.

Still other objects of the present invention rest with providing controls for a hydraulically driven vehicle, which are specifically designed so as to be capable of conducting proper damping for parking in a secure manner, and wherein the hydraulic pressure source for driving the motor for travel and the hydraulic pressure source for the parking brake are so designed as to be one and the same.

In the present invention, a vehicle can be caused to engage in forward movement and rearward movement by the proper operation of a lever for the control of travel in a manner effectuating a change-over to that end.

When either one of said pair of pedals arranged on the right side and the left side for the purpose of conducting additional directional control is put into operation, while the vehicle is in a state of forward movement or rearward movement, the pilot-actuated change-over valve for additional directional control arranged on the side of the respective pedals is actuated to a position for drainage, and the valve for travel arranged on the side of the pedals thus actuated is set in the neutral position.

Therefore, in the situation where both the lever for forward or rearward direction control of travel and the pedals for additional directional control are actuated at the same time, the vehicle is thereby put into a right revolution and left revolution also.

Since the lever for forward or rearward directional control of travel and the pedals for additional directional control are kept from being engaged with each other in mechanical terms, the operating mechanism for the lever for forward or rearward travel and that for the pedals for right or left directional control can be simplified respectively, in terms of the constitution thereof; therefore, even in a case where the lever for forward or rearward travel is subjected to change-over for operation thereof in a state wherein the pedals for additional directional control are actuated, the force required thereof can be properly kept from increasing.

The same hydraulic pressure source can now be employed for dual purposes. First, as the one for the pilot for driving the motors for travel arranged on the right side and on the left side for forward revolution and reverse revolution on the one hand and, secondly, as the one for the brake for the operation of parking on the other hand. Because of this, the hydraulic pressure circuit can be so designed as to be simplified, and a hydraulic circuit for the parking brake can be omitted in an advantageous manner.

When the valve of the parking brake is set in a position for drainage, and the parking brake is thus put into a state for damping, the hydraulic pressure discharged out of the hydraulic pressure source for the pilot is properly checked from flowing into the forward-reverse drive control circuit of the motor for travel. In other words, the hydraulic pressure is prevented from flowing into the pilot-actuated traveling valves arranged on the right side and on the left side; thus, a vehicle can be properly checked from traveling.

Therefore, now that the vehicle can be properly checked from traveling, with the parking brake kept intact in the state of being thus damped, each and every one of the sections interrelated therewith can be prevented, in a proper manner, from being subjected to breakage.

Furthermore, even in a case when an engine has been started for operation, parking can be damped in a proper manner by setting the valve of the parking brake at the position for drainage.

Also, in the case where the lever for travel is actuated immediately after starting the engine, the hydraulic pressure discharged out of the hydraulic pressure source for the pilot is caused to fill the space in the primary chamber of the parking brake. Then, the pilot-actuated traveling valve is properly changed over for actuation only after the parking brake is in a state for non-damping and the vehicle is caused to travel in a state wherein the parking brake is thus kept damped in a proper manner, and respective sections can be properly prevented from being subjected to breakage.

In other words, in the present invention, the working hydraulic pressure in the primary chamber of the parking brake and the working pressure of the pilot-actuated traveling valve are so designed as to be one and the same.

Other objects, features and advantages of the present invention will be rendered apparent through the following description given in conjunction with the accompanying drawings.

Figure 1:
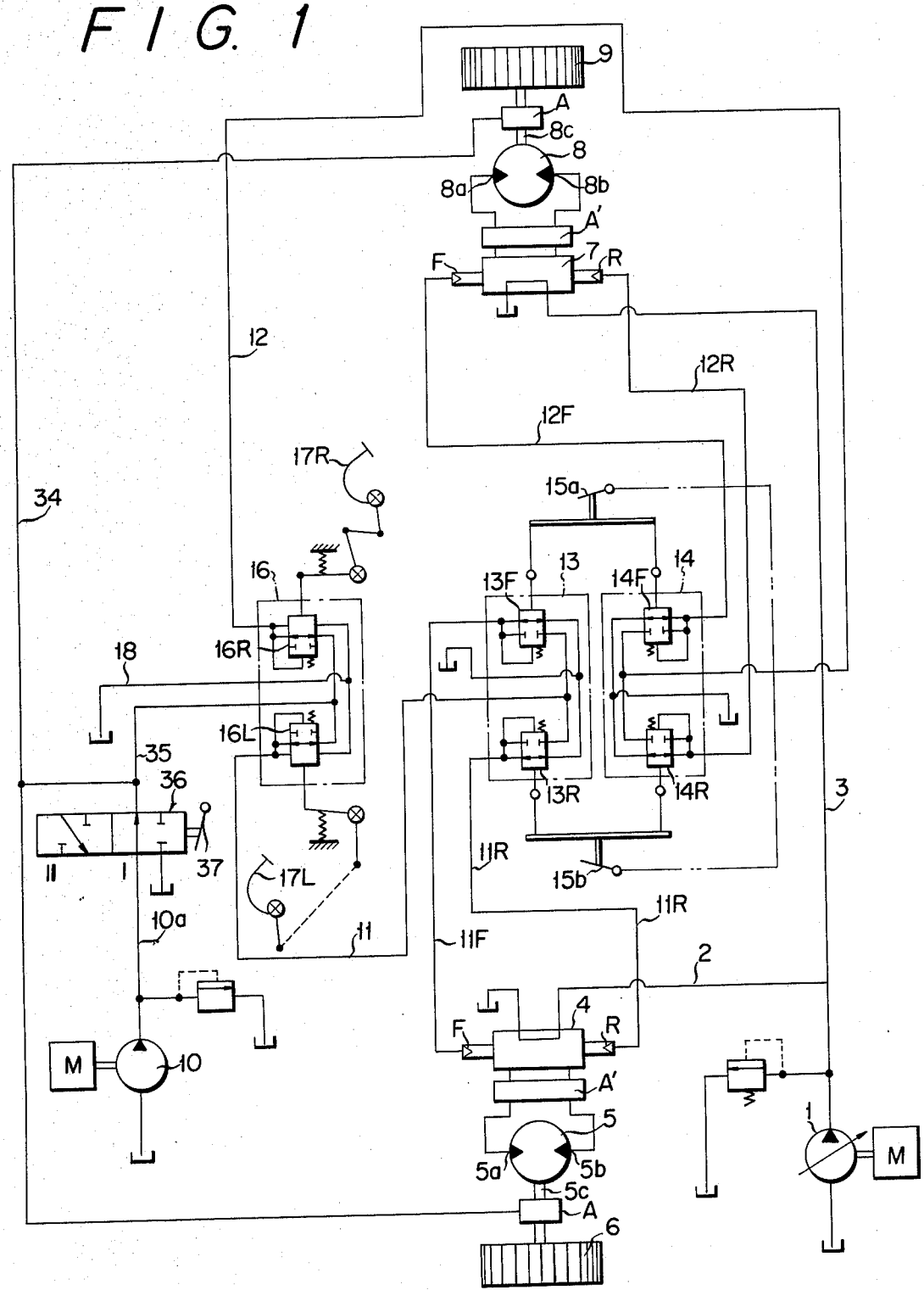
FIG. 1 is the hydraulic circuit diagram introduced in the present invention.

A detailed description of the present invention will be given below, by making reference to an illustration shown in the accompanying drawing.

DETAILED DESCRIPTION OF THE DRAWINGS

The fluid discharged by a pump 1 for travel is so divided as to flow through the primary pipeline 2 and the secondary pipeline 3. The primary pipeline 2 has a feed rate properly controlled so that the fluid to be fed to a forward port 5a and a reverse port 5b of a motor 5 for travel arranged on the left side through a pilot-actuated travel valve 4 and a brake valve A', also arranged on the left side, to thus drive the output shaft 5c of the motor 5 for travel arranged on the left side for either forward revolution or reverse revolution. The secondary pipeline 3 has a feed rate properly controlled so that the fluid will be fed to a forward port 8a and a reverse port 8b of a motor 8 for travel on the right side and through a pilot-actuated travel valve 7 and the brake valve A' arranged of the right side, thus driving the output shaft 8c of the motor 8 for travel arranged on the right side for either forward revolution or reverse revolution, and said output shaft 8c functions to drive a top belt 9 on the right side.

Numeral 10 is a pump for the pilot pressure. The discharge pipeline 10a is divided into a pilot pipeline 11 on the left side and a pilot pipeline 12 on the right side; wherein the pilot pipeline 11 on the left side is further divided into a pilot pipeline 11F for forward movement and a pilot pipeline 11R for rearward movement, and, the pilot pipelines 11F, 11R are connected in a continuous manner with the pilot-actuated travel valve 4 for forward movement and rearward movement, respectively. Meanwhile, the pilot pipeline 12 arranged on the right side, on a part thereof, is further divided into a pilot pipeline 12F for forward movement and a pilot pipeline 12R for rearward movement, and, the pilot pipelines 12F, 12R are continuous flow therethrough with the pilot-actuated travel valve 7 for forward movement and rearward movement arranged on the right side.

Numeral 13 is a first pilot change-over valve for travel arranged on the left side, provided with a valve 13F for forward movement and a valve 13R for rearward movement. Numeral 14 is a pilot change-over valve for travel arranged on the right side, provided with a valve 14F for forward movement and a valve 14R for rearward movement, each of said pilot change-over valves for travel 13, 14 is normally retained in the state of being engaged in a position for drainage, and each of said pilot change-over valves for travel 13, 14 is properly actuated by a pair of manually operated levers for travel 15a, 15b which are interlocked therewith, respectively, thus to be properly set in a position for being connected with each other in a continuous manner.

Numeral 16 is a second pilot change-over valve for directional control, provided with element 16R as a pilot change-over valve for right-ward directional control and element 16L as a pilot change-over valve for leftward directional control, wherein the pilot change-over valve 16L for leftward directional control, is properly retained in a state of engagement at a position for being connected in a continuous manner at all times, and is to be actuated by pedal 17L for leftward directional control in a manner as to be set at a position for cut-off; meanwhile, the pilot change-over valve 16R for rightward directional control, on a part thereof, is properly retained in the state of engagement at a position for being connected in a continuous manner at all times, and is to be actuated by a pedal 17R for rightward directional control in a manner so as to be set in a position for cut-off.

Figure 2:
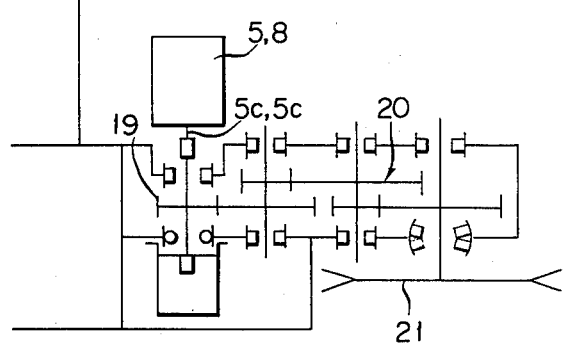
FIG. 2 is a sketch of the parking brake.
Figure 3:
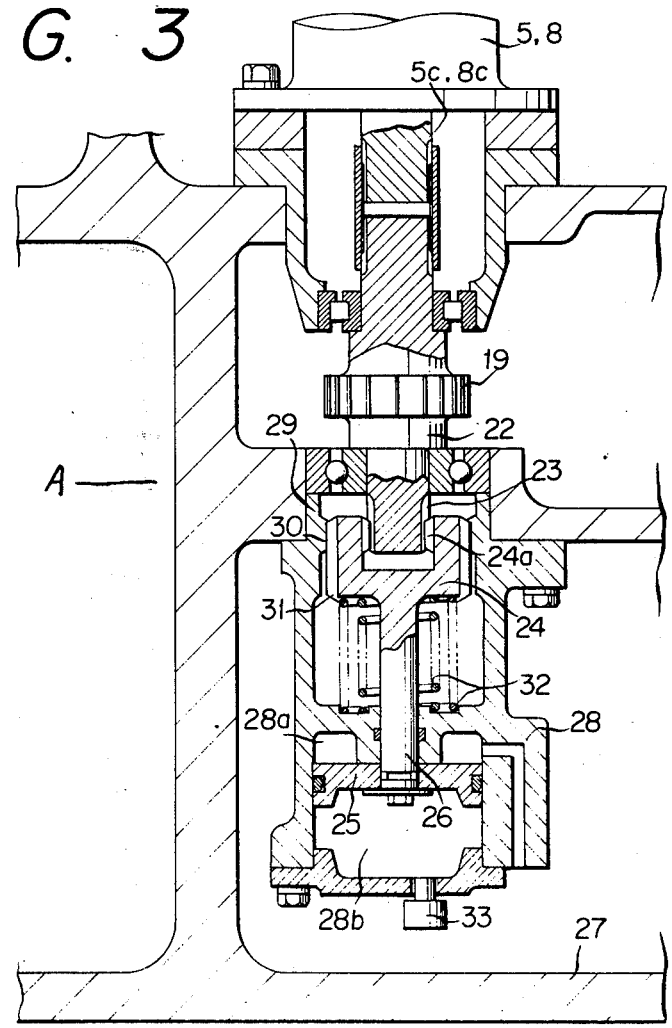
FIG. 3 is a detailed sectional drawing of the parking brake.

Element A is a brake mechanism for parking mounted in place on output shaft 5c of the left side and on an output shaft 8c on the right side, respectively, and said brake mechanism A for parking is constituted in a manner as is shown in FIGS. 2 and 3, respectively.

To be more concise, 19 is a gear interlocked with output shafts 5c and 8c of the motors for travel 5 and 8, respectively, and said gear 19 is interlocked with sprocket 21 of top bands 6 and 9 to be driven by the sprocket 21, thus actuating the travel of the vehicle in a proper manner.

A bearing shaft 22, of the gear 19, has a spline 23 properly formed thereon by the application of a skiving method, and said spline 23 has an engaging spline aperture 24a formed on an engaging piece 24 by skiving properly fitted in place therein.

The engaging piece 24 is properly formed on the shaft stem 26 of a piston 25 in a manner so as to constitute an integral entity. The piston 25 is fitted in place in a cylinder 28 which is fixed in place on a truck frame 27 in a manner so as to be free to slide therein and to thus form the primary chamber 28a and the secondary chamber 28b, and said engaging piece 24 has an outer periphery spline 31 fitted in place over an inner periphery spline 30 which is formed by skiving on a fitting boss section 29 of the cylinder 28 properly formed by skiving on the outer peripheral surface thereof. Furthermore, said engaging piece 24 is properly energized by a spring 32 in the direction of fit over the spline.

Furthermore, the secondary chamber 28b of the cylinder 28 is maintained in contact with the atmosphere through a muffler 33 made of stainless alloy casting, in a manner such that the shaft stem 26 of the piston 25 can be smoothly actuated in a reciprocating motion.

The primary chamber 28a of the cylinder 28 is connected in a continuous manner with the discharge pipeline 10a of said pump 10 for the pilot fluid through an oil feed pipeline 34, arid a parking brake valve 36 is properly arranged in place at a portion nearer to the pump 10 for the pilot fluid than the point of said connection.

The parking brake valve 36 is so designed as to be properly actuated by a control lever for change-over to be set either at a position I for continuous flow therethrough or at the position II for drainage, in a predetermined manner. In the drawing, M represents an engine for driving the pump.

A description of the actuation will be given below.

When the parking brake valve 36 is set at position I for continuous flow therethrough, the fluid discharged by the pump 10 for the pilot pressure is caused to flow into the primary chamber 28a of the cylinder 28, the piston 25 is caused to move against the force of the spring 32, and the engaging piece 24 is thus released from engagement with the spline 23 and the periphery spline 20 as well, whereby the bearing shaft 22 of the gear 19 is permitted to revolve; therefore, a vehicle is enabled to start moving.

When the lever 15 is actuated in a manner so as to be set in a position for forward movement, the pilot change-over valves 13F, 14F for forward movement and for travel arranged on the left and right sides, respectively, are actuated to a position for continuous flow therethrough, respectively. The fluid discharged by the pump 10 for the pilot fluid flows to the side of forward movement F of the valves for travel 4 and 7 arranged on the left and right, respectively. Each one of said valves 4, 7 is properly caused to be so changed over as to be set at a position for forward movement, and the fluid discharged by the pump for travel 1 is thus properly fed to the ports 5a and 8a for the forward revolution of the motors for travel 5 and 8 mounted in place on the left and right sides, respectively. Therefore, the motors for travel 5 and 8 mounted in place on the left and right sides, respectively, are thus driven in a manner so as to be placed in a forward revolution, whereby the top bands 6 and 9 mounted on the left and right sides, respectively, are driven in a predetermined manner, such that the vehicle is put into forward motion.

When the pedal 17L for directional control arranged on the left side is actuated and the pilot change-over valve 16L for leftward directional control is set in a position for drainage, the pilot pipeline on the left side 11 is caused to be properly connected in a continuous manner with the drain pipeline 18. As a result thereof, flow of the pilot fluid to the side of forward movement F of the pilot-actuated travel valve 4 on the left side is suspended, the pilot-actuated travel valve 4 on the left side is thus caused to be set in the neutral position, and the motor for travel 5 mounted on the left side is thereby caused to be suspended. When the motor for travel 5 mounted in place on the left side is thus suspended, the vehicle is caused to make a leftward turn.

Other items of actuation are as shown in the table given below.

pilot fluid is caused to flow into the pilot pipelines 11 and 12. For this reason, the fluid in the primary chamber 28a of the cylinder 28 is caused to flow into the drain, the piston 25 is caused to move to a state of engagement energized by the spring 32. The engaging spline aperture 24a of the engaging piece 24 and the outer periphery spline 31 are caused to innermesh with the spline 23 of the bearing shaft 22 and the inner periphery spline 30 of the boss section 29 for fitting the cylinder 28, respectively; therefore, the bearing shaft 22 of the gear 19 is properly fixed in place and the sprocket 21 is accordingly kept free from revolution. In other words, the parking brake is actuated in a predetermined manner.

In addition, where each and every one of the unit spline grooves of the spline 23 of the bearing shaft 22 of the gear 19 and that of the engaging spline aperture 24a of the engaging piece 24 are properly changed in terms of the length thereof, proper fitting can be effected in an easy and secure manner.

In conclusion, the spline 23 of the bearing shaft 22 and the engaging spline aperture 24a may both be of the jaw clutch type.

What is claimed is:

1. Controls for a hydraulically driven vehicle, comprising
   a. a hydraulic pressure source for travel,
   b. a primary valve means connected in a continuous manner with said hydraulic pressure source for travel,
   c. a motor connected in a continuous manner with said primary valve means,
   d. a hydraulic pressure source for a pilot fluid,
   e. a secondary valve means, wherein one end is connected in a continuous manner with said hydraulic pressure source for the pilot fluid, and the other end is connected in a continuous manner with said primary valve means, such that actuation of said primary valve means causes said secondary valve means to be kept energized in a position for drain-

| Operating members | | | Operating state | | | | |
|---|---|---|---|---|---|---|---|
| Lever for travel | (15) | Neutral | Forward movement(F) | Forward movement(F) | Forward movement(F) | Forward movement(F) | Rearward movement(R) |
| Pedal for leftward directional control | (17 L) | Neutral | Neutral | Actuation | Neutral | Actuation | Neutral |
| Pedal for rightward directional control | (17 R) | Neutral | Neutral | Neutral | Actuation | Actuation | Neutral |
| Pilot valve for leftward forward movement and travel | (13 F) | Drainage | Connection | Drainage | Connection | Drainage | Drainage |
| Pilot valve for leftward rearward movement and travel | (13 R) | Drainage | Drainage | Drainage | Drainage | Drainage | Connection |
| Pilot valve for rightward forward movement and travel | (14 F) | Drainage | Connecton | Connection | Drainage | Drainage | Drainage |
| Pilot valve for reightward rearward movement and travel | (14 R) | Drainage | Drainage | Drainage | Drainage | Drainage | Connection |
| Valve for leftward travel | (4) | Neutral | Forward movement | Neutral | Forward movement | Neutral | Rearward movement |
| Motor for leftward travel | (5) | Suspension | Forward revolution | Suspension | Forward revolution | Suspension | Reverse revolution |
| Valve for rightward travel | (7) | Neutral | Forward movement | Forward movement | Neutral | Neutral | Forward movement |
| Motor for rightward travel | (8) | Suspension | Forward revolution | Forward revolution | Suspension | Suspension | Reverse revolution |
| Pilot valve for leftward directonal control | (16 L) | Connection | Connection | Drainage | Connection | Drainage | Connection |
| Pilot valve for rightward directional control | (16 R) | Connection | Connection | Connection | Drainage | Drainage | Connection |
| Posture of vehicle | | Suspension | Forward straight movement | Forward leftward revolution | Forward rightward revolution | Suspension | Rearward straight movement |

Furthermore, when the parking brake valve 36 is set in a position II for drainage, the oil pipeline 34 is connected in a continuous manner with the drain, and no age at all times, f. a tertiary valve means is fitted in place on a pilot pipeline connected in a continuous manner with said hydraulic pressure source for the pilot fluid such as to be retained in an energized state at a connecting position at all times for conducting proper control of the drive of the vehicle, g. a parking brake mounted in place on an output shaft of a motor for travel, and h. a parking brake valve, wherein one end is connected in a continuous manner with said hydraulic pressure source for the pilot fluid, and the other end is connected in a continuous manner with said parking brake.

2. The controls for a hydraulically driven vehicle as set forth in claim 1, wherein said primary valve means is a pilot-actuated valve for travel, said secondary valve means is a pilot-actuated change-over valve for travel, and said tertiary valve means in a pilot-actuated change-over valve for directional control.

3. The controls for a hydraulically driven vehicle as set forth in claim 1, wherein said parking brake is properly actuated for braking by the force of a spring and properly released from braking by the force of hydraulic pressure.

4. The controls for a hydraulically driven vehicle as set forth in claim 1, wherein said parking brake is in plane engagement with the output shaft of said motor for travel.

5. Controls for a hydraulically driven vehicle, comprising a. a hydraulic pressure source for travel, b. primary valve means connected in a continuous manner with said hydraulic pressure source for travel, c. a motor connected in a continuous manner with said primary valve means, d. a hydraulic pressure source for a pilot fluid, e. secondary valve means for actuating said primary valve means, one end of said second valve means being connected in a continuous manner with said hydraulic pressure source for the pilot fluid and the other end being connected in a continuous manner with said primary valve, said secondary valve means being kept energized in a position for drainage at the neutral time, f. tertiary valve means for conducting proper control of the turning motion of the vehicle, said tertiary valve means being disposed in a pilot fluid pipeline which in turn being connected in a continuous manner with said hydraulic pressure source for the pilot fluid, g. a parking brake mounted in place on an output shaft of said motor, and h. a parking brake valve, wherein one end is connected in a continuous manner with said hydraulic pressure source for the pilot fluid, and the other end is connected in a continuous manner with said parking brake.

* * * * *